Patented July 29, 1952

2,605,191

UNITED STATES PATENT OFFICE 2,605,191

METHOD OF MAKING PLASTER OF PARIS PRODUCT

Alvin Richard Ingram, Glenshaw, and James Joseph Eberl, Chester, Pa., assignors to Johnson & Johnson, a corporation of New Jersey No Drawing. Application February 25, 1950, Serial No. 146,398

7 Claims. (Cl. 106—111)

This invention relates to the production of plaster of Paris products and is particularly concerned with plaster of Paris bandages for orthopedic purposes. This application is a continuation in part of our application Ser. No. 761,166, filed July 15, 1947, now abandoned.

Plaster of Paris, a hemi-hydrate of calcium sulfate, is commonly prepared by heating gypsum to remove a portion of the water of crystallization therefrom. For many applications the plaster of Paris is then mixed with water to form a paste which, after application to a surface or after formation to the desired shape, is allowed to rehydrate and crystallize forming a set, hard plaster mass. This process is used frequently in the formation of casts to aid in the setting of broken bones and in the immobilization of otherwise mobile members.

Mathey Patent 1,726,403, issued August 29, 1929, describes an orthopedic plaster of Paris bandage that comprises particles of plaster of Paris adhering to a backing of gauze, crinoline or the like. A bandage of this type is dipped in water by the physician for a brief period, then wrapped around a portion of the patient's body, and allowed to set up as a cast. This bandage is made by preparing a paste of plaster of Paris, spreading it upon the backing and drying it without hydrating. In order to prevent premature, spontaneous crystallization during this process, it is necessary to inhibit setting up of the plaster while producing the bandage. The Mathey patent discloses the use of crystallization retarders that are volatile and that can be removed by evaporation during the drying process. Weak acids, particularly acetic acid are suggested as transitory retarders in the patent reference and have been used extensively in industry for this purpose. Dr. Mathey's invention has attained great commercial success both in the United States and abroad and has resulted in considerable simplification of the production of plaster casts. Many millions of plaster bandages have been made in accordance therewith.

While the strength of the dry casts of the prior art has been considered satisfactory in nearly all instances, there have been complaints regarding weakness of the wet cast during the drying and crystallizing period of one to seven days that follows application of the bandage. Laboratory tests indicate that the wet strength of casts that have been retarded by a weak acid drops by an average of 41.3 per cent within twenty hours after wetting.

The invention is based upon the surprising discovery that loss of wet strength in plaster casts is caused by presence in the dried plaster of salts of the weak acids that are used as transitory inhibitors in the production of the bandage. The evidence indicates that these weak acids react in the plaster mix with acid-neutralizing impurities (hereafter called alkaline impurities) in the plaster of Paris to form a minute amount of salts such as calcium acetate, ammonium acetate, magnesium acetate, sodium acetate and calcium propionate or calcium formate, depending upon the impurity present and upon the type of weak acid inhibitor used. Acetic acid is commercially the most important inhibitor, but propionic or formic acid may also be used.

In accordance with the invention the presence in the plaster of Paris product of the alkaline salts of the weak acid retarders is avoided regardless of how they are formed. Tests prove conclusively that removal of these salts from the plaster of Paris results in products that do not lose their wet strength. Any treatment for removal of the objectionable salts may be used in accordance with the invention although esterification of the acid retarders or treatment of the plaster with an acid that is stronger (i. e. has a higher dissociation constant) than the acid retarder involved is preferred.

The acids found satisfactory in the execution of the invention are normally stronger than formic acid and fall into two main classes: (1) organic acids that are stronger than formic acid and that form water-insoluble calcium salts, i. e. calcium salts that have a solubility of less than one gram per one hundred cubic centimeters of water at twenty degrees centigrade and (2) inorganic acids, stronger than formic acid, regardless of whether their calcium salts are water-insoluble. It is surprising to note that organic acids that form soluble calcium salts appear unsuitable, while the process may be carried out to good advantage even with inorganic acids producing soluble salts, e. g. hydrochloric acid and nitric acid. Sulfuric acid is preferred because the calcium salt formed is similar to the plaster of Paris. However, all acids within the above-mentioned groups may be used to advantage in connection with transitory retarders based on weak organic acids such as formic, acetic and propionic acid.

A large excess of the weak acid retarders is used in the production of plaster of Paris products and accordingly the amount of objectionable salts present in the plaster products depends upon the amount of alkaline impurities in the raw plaster that is introduced into the mix. This amount varies depending upon the source of the gypsum. Plaster of Paris from English sources has only traces of calcium carbonate or other alkali present while the amount of alkaline impurities in plaster from sources in the United States varies from traces to approximately one-fifth of a per cent by weight in the case of plaster from Kansas to more than six per cent in the case of low grade plaster from New York. The extent of treatment required for removal of the objectionable salts varies accordingly. Removal of part or preferably of all of the salts of the weak acids proves beneficial but treatment by amounts of strong acids substantially in excess of those theoretically required to avoid the objectionable salts may in itself tend to weaken the cast. If stoichiometric amounts of the strong acids are used, a satisfactory product is obtained. The extent of treatment, however, may be varied within rather wide limits and it is noted that good casts result ordinarily provided the weight of strong acid applied is of the same order as the weight of alkaline impurities that have been introduced into the mix.

Plaster of Paris comprising originally less than one per cent alkaline impurities is preferred in the industry, although somewhat higher amounts may be made satisfactory in some respects by the use of this invention.

In order to disclose the nature of the present invention more clearly and in order to show the manner in which the invention may be carried out, specific examples illustrating preferred embodiments are described hereinafter in considerable detail. It should, however, be clearly understood that this is done not for the purpose of limiting the breadth of the invention or restricting the scope of the appended claims, but only to illustrate the principles involved.

*Examples I–V*

| Ingredients of the Mix (Parts by weight) | Example I | Example II | Example III | Example IV | Example V | Control A | Control B |
|---|---|---|---|---|---|---|---|
| Plaster of Paris: | | | | | | | |
| from Blue Rapids, Kansas (About 0.22% by weight alkaline reacting materials) | 100 | 100 | 100 | 100 | -------- | 100 | -------- |
| from Southward, Oklahoma (About 1.5% by weight alkaline reacting materials) | -------- | -------- | -------- | -------- | 100 | -------- | 100 |
| Acetic Acid | 25 | 25 | 25 | 25 | 25 | 25 | 25 |
| Oxalic Acid | 0.4 | -------- | -------- | -------- | -------- | -------- | -------- |
| Phosphoric Acid | -------- | 0.2 | -------- | -------- | -------- | -------- | -------- |
| Concentrated Sulfuric Acid | -------- | -------- | 0.15 | 0.2 | 1.5 | -------- | -------- |
| Water | 28 | 28 | 28 | 28 | 28 | 28 | 28 |
| Original wet tensile strength lbs. per square inch [1] | 85 | 85 | 85 | 85 | 82 | 85 | 80 |
| Wet tensile strength 20 hours after wetting, lbs. per square inch | 83 | 85 | 85 | 86 | 81 | 60 | 48 |

[1] 300 grams of dry plaster per 240 cc. water.

In the above examples the plaster of Paris and the acetic acid (which is shown in the examples merely as a typical example of the transitory retarders that are weak acids and form objectionable salts) were dispersed in water under mild agitation and thoroughly mixed to the consistency of a heavy paste. The stronger acid was added at the same time as the acetic acid or thereafter, either before or during application of the paste to the bandage. The paste was applied to crinoline in the form of a thin film by means of a knife coater. The coated material was then dried for about three minutes at a temperature of 310° F. Wet strength tests of typical samples give test results approximating those given in the table.

*Example VI*

Instead of effecting the above described treatment in the mix it is sometimes desirable to remove the objectionable salts after application of the plaster to the backing. For this purpose a crinoline weighing one and one-half ounces per square yard was prepared using for seventy pounds of gauze, thirty pounds of dextrin and one and one-half pounds of tartaric acid. Eleven ounces per square yard of solids of the plaster of Paris mix shown in the table as Control A was applied and the coated web was dried. Plaster of Paris casts made from this product showed substantially no loss in wet strength indicating that the acetates had been destroyed and tartrates had been formed.

In place of the acids sepcifically mentioned in the above examples, all other acids stronger than the weak acid retarders involved may be used. Those acids, however, forming salts that precipitate from the mix and are not objectionable in contact with the skin are preferred. Among commercially important acids found particularly useful are fumaric acid, hydrochloric acid, maleic acid, malic acid, nitric acid, oxalic acid, phosphoric acid, succinic acid, sulfuric acid, and tartaric acid.

Additional ingredients may be used in the plaster of Paris compound. Adhesives to aid in bonding the plaster particles to themselves and to the bandage are frequently utilized to assist in retaining the plaster of Paris on its support until the bandage is used and to prevent loss of plaster and telescoping as the bandage is wetted out and molded in service. Among adhesives that serve to satisfaction are dextrin, tapioca starch, methyl cellulose and polyvinyl alcohol. Certain types of plaster of Paris may require accelerators, e. g. potassium sulfate, which accelerate the ultimate setting time during application of the cast by the physician. Additional retarders in addition to the weak acid are often desirable and the water content of the spreading compound may be varied within relatively wide limits. Instead of crinoline, gauze or any other porous backing may be used with the plaster of Paris.

All embodiments within the scope of this specification and/or the appended claims are comprehended within the scope and spirit of this invention. These various embodiments of the invention were described for purposes of illustration rather than limitation. All variations and modifications of the invention are understood as being included within the scope of the following appended claims.

The claims are:

1. A process for making a settable plaster of Paris product from plaster of Paris, comprising a minor amount of alkaline impurities less than six per cent by weight comprising the steps: of forming a suspension of said impure plaster of Paris in water and of a weak acid as transitory retarder therefor and selected from the group consisting of acetic acid, formic acid and propionic acid; adding to said suspension a minor amount of a strong acid, not substantially in excess of the amount equivalent stoichiometrically to the amount of said impurities in said plaster, and selected from the group consisting of organic acids, stronger than formic acid, that form calcium salts the water solubility of which does not exceed one gram per one hundred cubic centimeters of water at twenty degrees centigrade, and of the inorganic acids stronger than formic acid; and drying said plaster of Paris at elevated temperature, thereby removing said water and said transitory retarder and forming said settable plaster of Paris product.

2. A process according to claim 1 in which the strong acid is a sulfuric acid.

3. A process according to claim 1 in which the strong acid is oxalic acid.

4. A process according to claim 1 in which the strong acid is phosphoric acid.

5. A process according to claim 1 in which the strong acid is hydrochloric acid.

6. A process according to claim 1 in which the strong acid is tartaric acid.

7. A process according to claim 1 in which the alkaline impurities comprise less than about one per cent by weight of said plaster of Paris.

ALVIN RICHARD INGRAM.
JAMES JOSEPH EBERL.

No references cited.